US012468760B2

(12) United States Patent
Aminian et al.

(10) Patent No.: US 12,468,760 B2
(45) Date of Patent: Nov. 11, 2025

(54) CUSTOMIZABLE FRAMEWORK TO EXTRACT MOMENTS OF INTEREST

(71) Applicant: ADOBE INC., San Jose, CA (US)

(72) Inventors: Ali Aminian, San Jose, CA (US); William Lawrence Marino, Hockessin, DE (US); Kshitiz Garg, Santa Clara, CA (US); Aseem Agarwala, Seattle, WA (US)

(73) Assignee: Adobe Inc., San Jose, CA (US)

( * ) Notice: Subject to any disclaimer, the term of this patent is extended or adjusted under 35 U.S.C. 154(b) by 530 days.

(21) Appl. No.: 17/452,626

(22) Filed: Oct. 28, 2021

(65) Prior Publication Data

US 2023/0140369 A1 May 4, 2023

(51) Int. Cl.
G06F 16/738 (2019.01)
G06F 3/0482 (2013.01)
G06V 20/40 (2022.01)

(52) U.S. Cl.
CPC .......... G06F 16/739 (2019.01); G06F 3/0482 (2013.01); G06V 20/47 (2022.01); G06V 2201/07 (2022.01)

(58) Field of Classification Search
CPC .. G06F 16/739; G06F 3/0482; G06F 3/04842; G11B 27/28; G11B 27/031; G06V 20/47; G06V 10/82; G06V 10/764; G06V 20/46; G06V 2201/07; H04N 21/8549
See application file for complete search history.

(56) References Cited

U.S. PATENT DOCUMENTS

| 6,104,398 | A  | 8/2000  | Cox, Jr. et al.   |
| 6,400,378 | B1 | 6/2002  | Snook             |
| 7,480,442 | B2 | 1/2009  | Girgensohn et al. |
| 7,796,857 | B2 | 9/2010  | Hiroi et al.      |
| 7,805,678 | B1 | 9/2010  | Niles et al.      |
| 8,290,345 | B2 | 10/2012 | Numoto            |
| 8,306,402 | B2 | 11/2012 | Ishihara          |

(Continued)

FOREIGN PATENT DOCUMENTS

CN 111601160 A 8/2020

OTHER PUBLICATIONS

First action interview—office action dated Feb. 3, 2022 in U.S. Appl. No. 17/017,362, 3 pages.

(Continued)

Primary Examiner — Congvan Tran
(74) Attorney, Agent, or Firm — Shook, Hardy & Bacon

(57) ABSTRACT

Embodiments of the present invention provide systems, methods, and computer storage media for extracting moments of interest (e.g., video frames, video segments) from a video. In an example embodiment, independent and/or orthogonal machine learning models are used to extract different types of features considering different modalities, and each frame in the video is assigned an importance score for each model. The importance scores for each model are combined into an aggregated importance score for each frame in the video. Depending on the embodiment, the aggregated importance scores are used to visualize the score per frame, identify moments of interest, automatically crop down the video into a highlight reel, browse or visualize the moments of interest within the video, and/or search across multiple videos.

20 Claims, 8 Drawing Sheets

(56) References Cited

U.S. PATENT DOCUMENTS

| | | | |
|---|---|---|---|
| 8,620,893 | B2 | 12/2013 | Howard et al. |
| 8,789,083 | B1 | 7/2014 | Landers et al. |
| 8,874,584 | B1 | 10/2014 | Chen et al. |
| 9,110,562 | B1 | 8/2015 | Eldawy |
| 9,583,140 | B1 | 2/2017 | Rady |
| 10,750,245 | B1 | 8/2020 | Zeiler et al. |
| 11,080,007 | B1 | 8/2021 | Melzer |
| 11,120,490 | B1 | 9/2021 | Pham et al. |
| 11,568,900 | B1 | 1/2023 | Achddou et al. |
| 11,683,290 | B1 | 6/2023 | Stern et al. |
| 11,880,918 | B2 | 1/2024 | Loui et al. |
| 2002/0061136 | A1 | 5/2002 | Shibata et al. |
| 2002/0186234 | A1 | 12/2002 | Van De Streek et al. |
| 2003/0093790 | A1 | 5/2003 | Logan et al. |
| 2003/0177503 | A1 | 9/2003 | Sull et al. |
| 2003/0234805 | A1 | 12/2003 | Toyama et al. |
| 2004/0125124 | A1 | 7/2004 | Kim et al. |
| 2004/0135815 | A1 | 7/2004 | Browne et al. |
| 2005/0203927 | A1 | 9/2005 | Sull et al. |
| 2005/0220348 | A1* | 10/2005 | Chiu .................. G06F 16/739 382/199 |
| 2006/0224983 | A1 | 10/2006 | Albrecht et al. |
| 2007/0022159 | A1 | 1/2007 | Zhu et al. |
| 2007/0025614 | A1 | 2/2007 | Qian |
| 2007/0044010 | A1 | 2/2007 | Sull et al. |
| 2007/0106693 | A1 | 5/2007 | Houh et al. |
| 2007/0201558 | A1 | 8/2007 | Xu et al. |
| 2008/0215552 | A1 | 9/2008 | Safoutin |
| 2009/0080853 | A1 | 3/2009 | Chen et al. |
| 2009/0172745 | A1 | 7/2009 | Horozov et al. |
| 2009/0231271 | A1 | 9/2009 | Heubel et al. |
| 2010/0070483 | A1 | 3/2010 | Delgo et al. |
| 2010/0088726 | A1 | 4/2010 | Curtis et al. |
| 2010/0107117 | A1 | 4/2010 | Pearce et al. |
| 2010/0111417 | A1 | 5/2010 | Ward et al. |
| 2010/0281372 | A1 | 11/2010 | Lyons et al. |
| 2011/0307084 | A1 | 12/2011 | Gehring et al. |
| 2012/0197763 | A1 | 8/2012 | Moreira |
| 2013/0027412 | A1 | 1/2013 | Roddy |
| 2013/0097507 | A1 | 4/2013 | Prewett |
| 2013/0236162 | A1 | 9/2013 | Kim et al. |
| 2013/0294642 | A1 | 11/2013 | Wang et al. |
| 2014/0105571 | A1 | 4/2014 | Chang et al. |
| 2014/0173484 | A1 | 6/2014 | Hicks |
| 2014/0270708 | A1 | 9/2014 | Girgensohn et al. |
| 2014/0340204 | A1 | 11/2014 | O'Shea et al. |
| 2014/0358807 | A1 | 12/2014 | Chinnappan et al. |
| 2015/0005646 | A1 | 1/2015 | Balakrishnan et al. |
| 2015/0052465 | A1 | 2/2015 | Altin et al. |
| 2015/0261389 | A1 | 9/2015 | Abate |
| 2015/0356355 | A1 | 12/2015 | Oguchi et al. |
| 2015/0370806 | A1 | 12/2015 | White et al. |
| 2016/0071524 | A1 | 3/2016 | Tammi et al. |
| 2017/0133054 | A1 | 5/2017 | Song et al. |
| 2017/0169128 | A1 | 6/2017 | Batchu Krishnaiahsetty et al. |
| 2017/0228138 | A1 | 8/2017 | Paluka et al. |
| 2018/0113579 | A1 | 4/2018 | Johnston et al. |
| 2020/0066305 | A1 | 2/2020 | Spence et al. |
| 2020/0090661 | A1 | 3/2020 | Ackerman et al. |
| 2020/0106965 | A1 | 4/2020 | Malia et al. |
| 2020/0138321 | A1 | 5/2020 | Niebauer |
| 2020/0334290 | A1 | 10/2020 | Dontcheva et al. |
| 2021/0081676 | A1 | 3/2021 | Kim et al. |
| 2021/0142827 | A1 | 5/2021 | Allen et al. |
| 2021/0406552 | A1* | 12/2021 | Hong .................. G06V 20/47 |
| 2022/0067386 | A1 | 3/2022 | Rotman et al. |
| 2022/0182577 | A1* | 6/2022 | Kumar .................. H04N 23/80 |
| 2022/0198194 | A1* | 6/2022 | Zhang .................. G06V 40/18 |
| 2022/0207282 | A1* | 6/2022 | Dong .................. G06V 40/166 |

OTHER PUBLICATIONS

Final Office Action dated Feb. 28, 2022 in U.S. Appl. No. 17/017,370, 32 pages.
Notice of Allowance dated Mar. 23, 2022 in U.S. Appl. No. 17/017,344, 7 pages.
Notice of Allowance dated Apr. 6, 2022 in U.S. Appl. No. 17/330,667, 8 pages.
Corrected Notice of Allowability dated Apr. 25, 2022 in U.S. Appl. No. 17/017,344, 2 pages.
Restriction Requirement dated Apr. 26, 2022 in U.S. Appl. No. 17/330,689, 6 pages.
Final Office Action received for U.S. Appl. No. 17/017,353, mailed on Jan. 4, 2024, 22 pages.
First Preinterview Communication dated Aug. 18, 2022 in U.S. Appl. No. 17/017,353, 31 pages.
Notice of Allowance received for U.S. Appl. No. 17/805,075, mailed on Feb. 14, 2024, 5 pages.
Notice of Allowance received for U.S. Appl. No. 17/805,076, mailed on Jan. 22, 2024, 3 pages.
Notice of Allowance received for U.S. Appl. No. 17/969,536, mailed on Jan. 17, 2024, 2 pages.
Shibata, M., "Temporal segmentation method for video sequence", Proceedings of SPIE, Applications in Optical Science and Engineering, Visual Communications and Image Processing, vol. 1818, pp. 1-13 (1992).
Swanberg, D., et al., "Knowledge-guided parsing in video databases", Proceedings of SPIE, IS&T/SPIE's Symposium on Electronic Imaging: Science and Technology, Storage and retrieval for Image and Video Databases, vol. 1908, pp. 1-13 (Apr. 14, 1993).
Mcdarris, J., "Adobe Photoshop Tutorial: EVERY Tool in the Toolbar Explained and Demonstrated", You Tube, Retrieved from Internet URL: https://www.youtube.com/watch?v=2cQT1ZgvgGI, accessed on Jun. 21, 2023, p. 3.
Final Office Action dated Jun. 14, 2023 in U.S. Appl. No. 17/017,353, 34 pages.
Final Office Action dated Jun. 20, 2023 in U.S. Appl. No. 17/330,689, 13 pages.
Non Final Office Action dated Jun. 14, 2023 in U.S. Appl. No. 17/805,080, 9 pages.
Non Final Office Action dated May 19, 2023 in U.S. Appl. No. 17/805,076, 9 pages.
Non Final Office Action dated Jun. 30, 2023 in U.S. Appl. No. 17/330,702, 7 pages.
Non Final Office Action dated Jun. 12, 2023 in U.S. Appl. No. 17/330,718, 7 pages.
Non Final Office Action dated May 18, 2023 in U.S. Appl. No. 17/805,075, 9 pages.
Final Office Action dated Jul. 19, 2023 in U.S. Appl. No. 17/969,536, 18 pages.
Notice of Allowance dated Aug. 16, 2023 in U.S. Appl. No. 17/805,076, 5 pages.
"Apple, Final Cut Pro 7 User Guide", 2020, Retrieved from Internet URL: https://prohelp.apple.com/finalcutpro_helpr01/English/en/finalcutpro/usermanual/index.html#chapter=7%26section=1), pp. 11 (Year: 2010).
Notice of Allowance dated Feb. 8, 2023 in U.S. Appl. No. 17/017,366, 5 pages.
Non-Final Office Action dated Jan. 24, 2023 in U.S. Appl. No. 17/330,689, 13 pages.
Notice of Allowance dated Feb. 2, 2023 in U.S. Appl. No. 17/017,370, 6 pages.
Non-Final Office Action dated Feb. 16, 2023 in U.S. Appl. No. 17/969,536, 16 pages.
Final Office Action dated Mar. 9, 2023 in U.S. Appl. No. 17/330,702, 8 pages.
Final Office Action dated Mar. 9, 2023 in U.S. Appl. No. 17/330,718, 8 pages.
Notice of Allowance dated Apr. 18, 2023 in U.S. Appl. No. 17/330,677, 5 pages.
Notice of Allowance dated Jul. 13, 2022 in U.S. Appl. No. 17/017,366, 7 pages.
Non-Final Office Action dated Jul. 29, 2022 in U.S. Appl. No. 17/017,370, 37 pages.
Final Office Action dated Aug. 15, 2022 in U.S. Appl. No. 17/017,362, 7 pages.

(56) References Cited

OTHER PUBLICATIONS

Preinterview first office action dated Aug. 18, 2022 in U.S. Appl. No. 17/017,353, 5 pages.
Non-Final Office Action dated Sep. 29, 2022 in U.S. Appl. No. 17/330,677, 12 pages.
Final Office Action dated May 9, 2022 in U.S. Appl. No. 17/017,366, 14 pages.
Non-Final Office Action dated Jun. 2, 2022 in U.S. Appl. No. 17/330,689, 9 pages.
Non-Final Office Action dated Oct. 24, 2022 in U.S. Appl. No. 17/330,702, 9 pages.
Non-Final Office Action dated Oct. 24, 2022 in U.S. Appl. No. 17/330,718, 10 pages.
Non-Final Office Action dated Oct. 26, 2022 in U.S. Appl. No. 17/330,702, 8 pages.
Final Office Action dated Oct. 27, 2022 in U.S. Appl. No. 17/330,689, 8 pages.
Notice of Allowance dated Nov. 21, 2022 in U.S. Appl. No. 17/017,362, 5 pages.
First Action Interview Office Action dated Nov. 22, 2022 in U.S. Appl. No. 17/017,353, 4 pages.
Final Office Action dated Jan. 4, 2023 in U.S. Appl. No. 17/330,677, 12 pages.
Non-Final Office Action dated Sep. 1, 2023 in U.S. Appl. No. 17/017,353, 32 pages.
Non-Final Office Action dated Sep. 21, 2023 in U.S. Appl. No. 17/805,075, 5 pages.
Notice of Allowance dated Oct. 4, 2023 in U.S. Appl. No. 17/330,718, 5 pages.
Notice of Allowance dated Oct. 18, 2023 in U.S. Appl. No. 17/969,536, 7 pages.
Notice of Allowance dated Nov. 1, 2023 in U.S. Appl. No. 17/805,080, 5 pages.
Final Office Action dated Nov. 15, 2023 in U.S. Appl. No. 17/330,702, 7 pages.
Notice of Allowance dated Sep. 11, 2023 in U.S. Appl. No. 17/330,689, 5 pages.
Girgensohn, Andreas, et al. "Locating information in video by browsing and searching." Interactive Video: Algorithms and Technologies. Berlin, Heidelberg: Springer Berlin Heidelberg, 2006. 207-224. (Year: 2006).
Non-Final Office Action received for U.S. Appl. No. 17/805,907, mailed on Mar. 13, 2024, 8 pages.
Notice of Allowance received for U.S. Appl. No. 17/017,353, mailed on Mar. 6, 2024, 10 pages.
Notice of Allowance received for U.S. Appl. No. 17/330,702, mailed on Mar. 4, 2024, 5 pages.
Shipman, Frank, Andreas Girgensohn, and Lynn Wilcox. "Generation of interactive multi-level video summaries." Proceedings of the eleventh ACM international conference on Multimedia. 2003. (Year: 2003).
Alcázar, J.L., et al., "Active Speakers in Context," Proceedings of the IEEE/CVF Conference on Computer Vision and Pattern Recognition (CVPR), pp. 12465-12474 (2020).
Chinfat, "E15—The Tool Bar/The Selection Tool—Adobe Premiere Pro CC 2018," accessed at https://www.youtube.com/watch?v=IJRhzOqrMzA, p. 1 (May 8, 2018).
"Hierarchical Segmentation of video timeline and matching searh data," accessed https://www.google.com/search?q-hierarchical+segmentation+of+video+timeline+and+matching+search+data&hl=en&blw=1142&bih=547&tbm=pts&s . . . , accessed on Dec. 2, 2021, pp. 2.
"Transient oscillation video matching," accessed at https://www.google.com/search?q=transient+oscillation+video +matching&hl=en&biw=1225&bih=675&tbm=pts&sxsrf=AOaemvJjtgRC6aa4ltvNUFxJa6 . . . , accessed on Dec. 2, 2021, pp. 2.
Co-pending U.S. Appl. No. 16/879,362, filed May 20, 2020.
Preinterview First Office Action dated Sep. 27, 2021 in U.S. Appl. No. 17/017,366, 5 pages.
Preinterview first Office Action dated Sep. 30, 2021 in U.S. Appl. No. 17/017,362, 4 pages.
Restriction Requirement dated Oct. 18, 2021 in U.S. Appl. No. 17/017,344, 5 pages.
Non-Final Office Action dated Nov. 9, 2021 in U.S. Appl. No. 17/017,344, 9 pages.
First Action Interview—Office Action dated Dec. 3, 2021 in U.S. Appl. No. 17/017,366, 4 pages.
Non-Final Office Action dated Dec. 7, 2021 in U.S. Appl. No. 17/017,370, 26 pages.
Office Action received for GB Patent Application No. 2206709.4, mailed on Jul. 9, 2024, 3 pages.
Final Office Action received for U.S. Appl. No. 17/805,907, mailed on Aug. 1, 2024, 8 pages.
Final Office Action received for U.S. Appl. No. 17/805,907, mailed on Jan. 10, 2025, 9 pages.
Non-Final Office Action received for U.S. Appl. No. 17/805,907, mailed on Oct. 28, 2024, 8 pages.
Non-Final Office Action received for U.S. Appl. No. 17/805,907, mailed on May 19, 2025, 9 pages.
Office Action received for Chinese Patent Application No. 202210515554.X, mailed on Aug. 27, 2025, 29 pages (15 pages of English Translation and 14 pages of Original Office Action).

* cited by examiner

CUSTOMIZABLE FRAMEWORK TO EXTRACT MOMENTS OF INTEREST

BACKGROUND

Recent years have seen a proliferation in the use of video, which has applications in practically every industry from film and television to advertising and social media. Businesses and individuals routinely create and share video content in a variety of contexts, such as presentations, tutorials, commentary, news and sports segments, blogs, product reviews, testimonials, comedy, dance, music, movies, and video games, to name a few examples. Video can be captured using a camera, generated using animation or rendering tools, edited with various types of video editing software, and shared through a variety of outlets. Indeed, recent advancements in digital cameras, smartphones, social media, and other technologies have provided a number of new ways that make it easier for even novices to capture and share video. Accordingly, and for other reasons, people often want to identify or trim interesting content from a video. However, conventional video browsing and editing workflows are often considered tedious, challenging, or even beyond the skill level of many users.

SUMMARY

Embodiments of the present invention are directed to extracting moments of interest (e.g., video frames, video segments) from a video. In an example embodiment, independent and/or orthogonal machine learning models are used to extract different types of features considering different modalities, and each frame in the video is assigned an importance score for each model. The importance scores for each model are combined into an aggregated importance score for each frame in the video. Depending on the embodiment, the aggregated importance scores are used to visualize the score per frame, identify moments of interest, automatically crop down the video into a highlight reel, browse or visualize the moments of interest within the video, search across multiple videos, and/or other uses.

In some embodiments, a user interface accepts one or more input parameters that serve to customize the moments of interest identified from a video. An example user interface accepts a selection of desired sets of modalities (e.g., which type(s) of feature detection to use, such as facial detection, object or action detection, audio event detection, visual scene detection, facial expression sentiment detection, speech sentiment detection, frame quality detection), machine learning models, and/or modality weights to allow each user to customize which signals are used and/or how they are combined to generate the aggregated importance scores and moments of interest. Other example input parameters include a desired set of feature classes to prioritize (e.g., smiles, laughter, cheering, paddling, jumping, pets, children playing) and/or preferred class weights, which allow each user to customize which classes are used and/or how they are combined to generate importance scores in any given modality. In yet another example, a user interface accepts a freeform text query. A textual embedding of the query and a visual embedding of a video frame are used to predict whether the video frame is relevant to the query, and an importance score is generated per frame based on the predicted relevance.

In some embodiments, moments of interest (e.g., video frames and/or video segments of interest) are identified based on aggregated importance scores (e.g., based on a threshold score, a minimum segment duration, a target segment duration from each interval of the video, a cumulative duration of a summary video, dynamic programming, etc.). Depending on the embodiment, the video frames and/or video segments of interest identified from a video are used in various ways. In some embodiments, the video is cropped down into a highlight reel or a summary video that includes only the identified video frames or video segments of interest. In some embodiments, a video timeline (e.g., a playback or editing timeline) is updated to include a visual representation of the video frames/segments of interest and/or of the aggregated importance scores (e.g., flags representing timeline locations of peak scores, and/or start/stop times of video segments of interest, thumbnails at timeline locations of peak scores and/or start times of video segments of interest). In some embodiments, a representation of the video frames/segments of interest and/or of the aggregated importance scores are exposed to a file management or search system to enable searching and/or browsing multiple videos.

As such, using various embodiments, a user can customize, search, browse, trim, playback, and/or export moments of interest within one or more videos.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Overview

Figure 1:
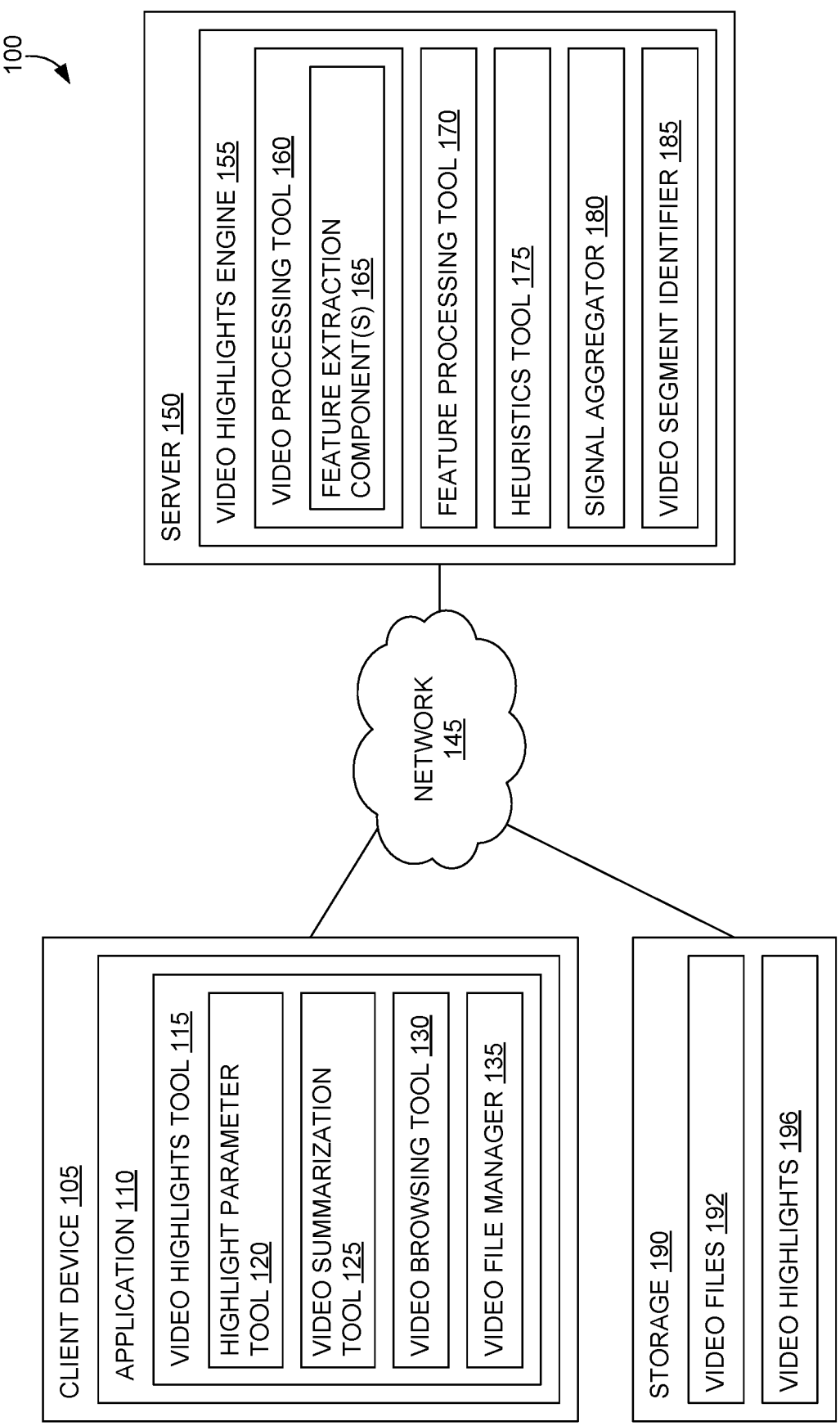
FIG. 1 is a block diagram of an example computing system suitable for identification or extraction of moments of interest, in accordance with embodiments of the present invention.

A video file, clip, or project can usually be split up into visual and audio elements. For example, a video might encode or otherwise identify a video track comprising a sequence of still images (e.g., video frames) and an accompanying audio track comprising one or more audio signals. Video editing software, such as ADOBE® PREMIERE® PRO, ADOBE PREMIERE ELEMENTS, or ADOBE PREMIERE RUSH, typically includes a graphical user interface (GUI) that lets users select and edit particular video frames. Some common operations include importing, trimming, cropping, rearranging, applying transitions and effects, adjusting color, adding titles and graphics, exporting, and others. However, conventional editing workflows are often considered tedious, challenging, or even beyond the skill level of many users. In many cases, using conventional video editing techniques to identify and trim moments of interest from a video takes too long.

Some designers have tried to make users' lives easier by automatically identifying moments of interest from videos. However, there are a number of challenges to accomplishing this. Initially, finding moments of interest in videos is a multimodal problem. Videos often tell stories, but videos typically include different elements (e.g., visual, audio, and speech) that contribute to different stories in different ways. Different machine learning models can be used to understand different parts of a video, but it is often not possible or practical to optimize a single machine learning model to semantically understand all elements of a video. Second, which moments are considered to be of interest is subjective. Different people have different conceptions of what is interesting and often find different moments in videos interesting based on different preferences. A particular video segment may be interesting to someone who enjoys soccer, but not for someone who enjoys spending time with pets, or for an artist who likes photography. Conventional one-size-fits-all solutions will often fail to identify moments that everyone actually considers to be of interest. Third, it is often desirable for systems to provide extensibility to adapt to new modalities or custom applications. However, conventional solutions that use a fixed architecture are typically not extensible to new or custom modalities. Fourth, it is often desirable for automated outputs to be explainable. However, conventional techniques that use machine learning models to identify moments of interest typically lack explainability because the inner layers of the machine learning models are not exposed, so it is not clear how signals from different modalities are being combined.

Furthermore, most conventional techniques that seek to identify moments of interest from videos try to solve this problem in an end-to-end fashion using one single model. However, one model will likely not be capable enough to understand a video from different perspectives and to capture interesting moments effectively across different modalities. Some prior techniques use a single end-to-end model to attempt to identify moments of interest from a video directly from visual and audio elements of the video. However, end-to-end models like this tend to function as a black box, so the outputs often typically lack explainability. Similarly, there is typically a lack of control over the inner workings of end-to-end models, and as a result, end-to-end models trained on some videos often fail to generalize well to other videos, negatively impacting performance. Moreover, relevant datasets are not always available, so it is often time consuming or even impractical to collect training data and train models in an end-to-end fashion. Additionally, prior techniques generally do not address the subjective nature of moments of interest, and do not provide a way to extend their designs to consider additional modalities without changing the design and architecture of their underlying model, which is often impractical or unfeasible. As such, there is a need for improved techniques for identifying and extracting moments of interest from videos.

Accordingly, embodiments of the present invention are directed to extracting moments of interest (e.g., video frames, video segments) from a video. In an example embodiment, independent and/or orthogonal machine learning models are used to extract different types of features considering different modalities, and each frame in the video is assigned an importance score for each model (e.g., from 0 to 1, where 0 means a given frame is unlikely to be an interesting moment, and 1 means highly likely to be an interesting moment). The importance scores for each model are combined into an aggregated importance score for each frame in the video. Depending on the embodiment, the aggregated importance scores are used to visualize the score per frame, identify moments of interest (e.g., video frames, video segments), automatically crop down the video into a highlight reel, browse or visualize the moments of interest within the video, and/or search across multiple videos.

In some embodiments, the different modalities, machine learning models, classes of detected features, and/or other parameters used to generate the aggregated importance scores are pre-determined and/or selected by default. In some cases, a user interface accepts inputs customizing one or more parameters. In an example implementation, the user interface accepts inputs selecting a desired set of modalities, machine learning models, and/or modality weights to allow each user to customize which signals are used and/or how they are combined to generate the aggregated importance scores and moments of interest. Additionally or alternatively, the user interface accepts inputs selecting a desired set of supported classes (e.g., class tags), and corresponding weights are set to prioritize the selected classes. In some embodiments, the user interface accepts a freeform text query, one or more machine learning models featurize the text query and predict whether each video frame is relevant to the query, and a corresponding signal (e.g., 0 and 1 indicating frames that are and are not likely to be relevant to the query, respectively) is used as one of the importance scores that gets combined into an aggregated importance score for each frame in the video. As such, various implementations enable users to customize the modalities, machine learning models, classes, and/or other parameters used to generate aggregate importance scores and/or moments of interest.

In some embodiments, moments of interest (e.g., video frames and/or video segments of interest) are identified based on the aggregated importance scores. In a simple example, each video frame with an aggregated importance score above some threshold (e.g., 0.6) is identified, and a video segment that includes the video frame is identified (e.g., a video segment with a minimum duration like 2 or 4 seconds, centered on or around a peak score or cluster of scores above a threshold, etc.). In another example, a video segment with a particular duration (e.g., 4 or 6 seconds) is identified from each minute of video. For each minute, the video frame with the peak aggregated importance score is identified, and a corresponding video segment (e.g., centered on the peak value) with the particular duration is trimmed.

In yet another example, dynamic programming is used to identify video segments of interest. Generally, the longer the duration, the easier it is to communicate a story, so some embodiments weight longer video segments higher. However, it may not be desirable to identify a maximum length for a video segment (e.g., to avoid hour-long video segments). Accordingly, some embodiments compute an average aggregated importance score for frames in a candidate video segment, combine this average importance score with a duration score, and identify candidate video segments with the highest combined scores. In some embodiments, an average importance score is determined by averaging the per-frame aggregated importance scores in each 1-second video segment, 2-second video segment, 3-second video segment, etc. of the video, up to some maximum duration (e.g., 20 seconds). Each video segment's duration is divided by the maximum duration to arrive at a normalized duration score (e.g., 20-second clips have a normalized duration score of 1). Each average importance score is combined (e.g., averaged) with its corresponding normalized duration score to arrive at a combined score for each candidate video segment, the combined scores are sorted, and the candidate video segments with the highest combined scores are identified as video segments of interest. In an example implementation, video segments of interest are accumulated until their cumulative duration adds up to (e.g., is equal to or greater than) some designated duration of video segments (e.g., 1 minute).

Depending on the embodiment, the video frames and/or video segments of interest identified from a video are used in various ways. In some embodiments, the video is cropped down into a highlight reel or a summary video that includes only the identified video frames or video segments of interest. In some embodiments, a video timeline (e.g., a playback or editing timeline) is updated to include a visual representation of the video frames/segments of interest and/or of the aggregated importance scores (e.g., flags representing timeline locations of peak scores, and/or start/stop times of video segments of interest, thumbnails at timeline locations of peak scores and/or start times of video segments of interest). In some embodiments, a representation of the video frames/segments of interest and/or of the aggregated importance scores are exposed to a file management or search system to enable searching and/or browsing multiple videos. In an example implementation, toggling a highlights search filter causes the file management or search system to search, filter, or otherwise return a representation of videos with one or more identified video frames/segments of interest (whether based on default parameters or user-selected video search parameters), such as a list of videos that have identified video segments of interest, or a list of identified video segments of interest. In some cases, the file management or search system exposes scores (e.g., peak score per video or video segment) through a dashboard, sorts matching videos or video segments by score, and/or tranches matching videos or video segments by score (e.g., high scores, medium scores, low scores). In some embodiments, video files are visually represented with one or more thumbnails corresponding to peak scores and/or start times of video segments of interest. Additionally or alternatively, when one of the videos is selected, the file management or search system previews one or more identified video frames/segments of interest in the video (e.g., by displaying the one or more thumbnails, or otherwise previewing video frames/segments of interest).

As such, a user can customize, search, browse, trim, playback, and/or export moments of interest within one or more videos. By generating separate importance scores using independent and/or orthogonal machine learning models, the importance scores can be combined to capture interesting moments across different modalities in a customizable way that is therefore explainable. Furthermore, by generating and combining separate importance scores from independent and/or orthogonal machine learning models, the underlying framework is extensible by adding a desired machine learning model in a new branch. As such, unlike prior techniques, various embodiments extract moments of interest in a way that considers any number of modalities, addresses the subjective nature of what is considered interesting, and provides explainability and extensibility.

Example Video Environment

Referring now to FIG. 1, a block diagram of example environment 100 suitable for use in implementing embodiments of the invention is shown. Generally, environment 100 is suitable for video processing, browsing, playback, and/or editing, and among other things, facilitates identification or extraction of moments of interest from one or more videos. At a high level, environment 100 includes client device 105, server 150, and storage 190.

Depending on the implementation, client device 105 and/or server 150 are any kind of computing device capable of facilitating identification or extraction of moments of interest. For example, in an embodiment, client device 105 and/or server 150 are each a computing device such as computing device 800 of FIG. 8. In some embodiments, client device 105 and/or server 150 are a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

In various implementations, the components of environment 100 include computer storage media that stores information including data, data structures, computer instructions (e.g., software program instructions, routines, or services), and/or models (e.g., machine learning models, 3D models) used in some embodiments of the technologies described herein. For example, in some implementations, client device 105, server 150, and/or storage 190 each comprise a data store (or computer data memory). Further, although client device 105, server 150, and storage 190 are each depicted as a single component in FIG. 1, in some embodiments, client device 105, server 150, and/or storage 190 are implemented using any number of data stores (e.g., using local and/or cloud storage), and/or any data or components described herein are stored on any suitable data store(s) and any suitable device(s).

In the example illustrated in FIG. 1, the components of environment 100 communicate with each other via a network 145. In some non-limiting example implementations, network 145 includes one or more local area networks (LANs) and/or wide area networks (WANs). Such networking environments are commonplace in offices, enterprise-wide computer networks, intranets, and the Internet.

In the example illustrated in FIG. 1, client device 105 includes application 110 with video highlights tool 115, and server 150 includes video highlights engine 155. In some embodiments, video highlights tool 115, video highlights engine 155, and/or any of the elements illustrated in FIG. 1 are incorporated, or integrated, into an application(s), or an add-on(s) or plug-in(s) to an application(s). In some embodiments, the application(s) is a stand-alone application, a mobile application, a web application, or the like. For example, in some implementations, the application(s) comprises a web application that runs in a web browser and/or is hosted at least partially server-side. In some cases, the application is integrated into an operating system (e.g., as a service). In some embodiments, the application(s) is any application capable of facilitating video browsing, playback, or editing, such as ADOBE PREMIERE PRO, ADOBE PREMIERE ELEMENTS, or ADOBE PREMIERE RUSH. Although some embodiments are described with respect to an application(s), some implementations additionally or alternatively integrate any of the functionality described herein into an operating system (e.g., as a service), a server (e.g., a remote server), a distributed computing environment (e.g., as a cloud service), and/or otherwise.

Depending on the embodiment, various allocations of functionality are implemented across any number and/or type(s) of devices. In the example illustrated in FIG. 1, video highlights tool 115 and video highlights engine 155 coordinate via network 145 to execute the functionality described herein. In another example, video highlights tool 115 and video highlights engine 155 (or some portion thereof) are integrated into a common application executable on a single device. In yet another example, video highlights tool 115 and video highlights engine 155 (or some portion thereof) are distributed across some other number and/or type(s) of devices. These are just examples, and any suitable allocation of functionality among these or other devices is possible within the scope of the present disclosure.

To begin with a high-level overview of an example workflow through the configuration illustrated in FIG. 1, client device 105 is a desktop, laptop, or mobile device such as a tablet or smart phone, and application 110 provides one or more user interfaces. In some embodiments, a user accesses a video through application 110, loads or uploads a video, and/or otherwise uses application 110 to identify the location where a video is stored (whether local to client device 105, at some remote location such as storage 190, or otherwise). In some cases, a user records a video using video recording capabilities of client device 105 (or some other device) and/or some application executing at least partially on the device (e.g., ADOBE PREMIERE RUSH). In some embodiments, application 110 uploads the video (e.g., to some accessible storage 190 for video files 192) or otherwise communicates the location of the video to server 150, and video highlights engine 155 receives or access the video and performs one or more functions on the video, such as identifying or extracting moments of interest from the video.

In some embodiments, the one or more functions performed by video highlights engine 155 depend on the use case, which component of video highlights tool 115 was used to trigger video highlights engine 155, and/or one more parameters identified via highlight parameter tool 120. In some cases, video highlights engine 155 uses multiple independent and/or orthogonal machine learning models (e.g., feature extraction component(s) 165) to extract different types of features across different modalities, assigns an importance score for each frame in the video for each model based on the extracted features, and combines the importance scores for each model into an aggregated importance score for each frame in the video. In some embodiments, based on the aggregated importance scores, video highlights engine 155 identifies, generates, and/or stores a representation of one or more video segments of the video (e.g., video highlights 196) that represent moments of interest. As such, video highlights engine 155 and/or video highlights tool 115 access a video (e.g., one of video files 192) and generate and store a representation of one or video segments of interest (e.g., video highlights 196), corresponding aggregated importance scores, and/or some representation thereof in any suitable storage location, such as storage 190, client device 105, server 150, some combination thereof, and/or other locations.

Depending on the use case and/or which component of video highlights tool 115 was used to trigger video highlights engine 155, the aggregated importance scores and/or video highlights 196 are used in various ways. In some embodiments, video highlights tool 115 causes some visualization of the aggregated importance scores per frame (e.g., by superimposing scores on top of the video during playback, by displaying a graph of the scores against time or frame number). In some embodiments, video highlights tool 115 (e.g., video summarization tool 125) provides video highlights 196 as a highlight reel or a summary video for playback, editing, downloading, sharing to social media or some other internet location, etc. In another example, video highlights tool 115 (e.g., video browsing tool 130) provides an interface such as a playback or editing timeline that provides functionality for browsing or visualizing the identified video highlights 196 within the video. In yet another example, video highlights tool 115 (e.g., video file manager 135) provides an interface that provides functionality for browsing or searching multiple videos (video files 192) based on aggregated importance scores and/or identified video highlights 196 within the videos. These are just a few examples and other implementations are contemplated within the scope of the present disclosure.

Turning now to a more detailed discussion of the components of FIG. 1, video highlights tool 115 includes highlight parameter tool 120, video summarization tool 125, video browsing tool 130, and video file manager 135. In an example implementation, video highlights tool 115 and/or its constituent components cause one or more user interfaces (or a portion thereof) to present one or more windows, panels, menus, tools, and/or interaction elements that accept various input parameters and/or trigger different types of functions.

Figure 2:
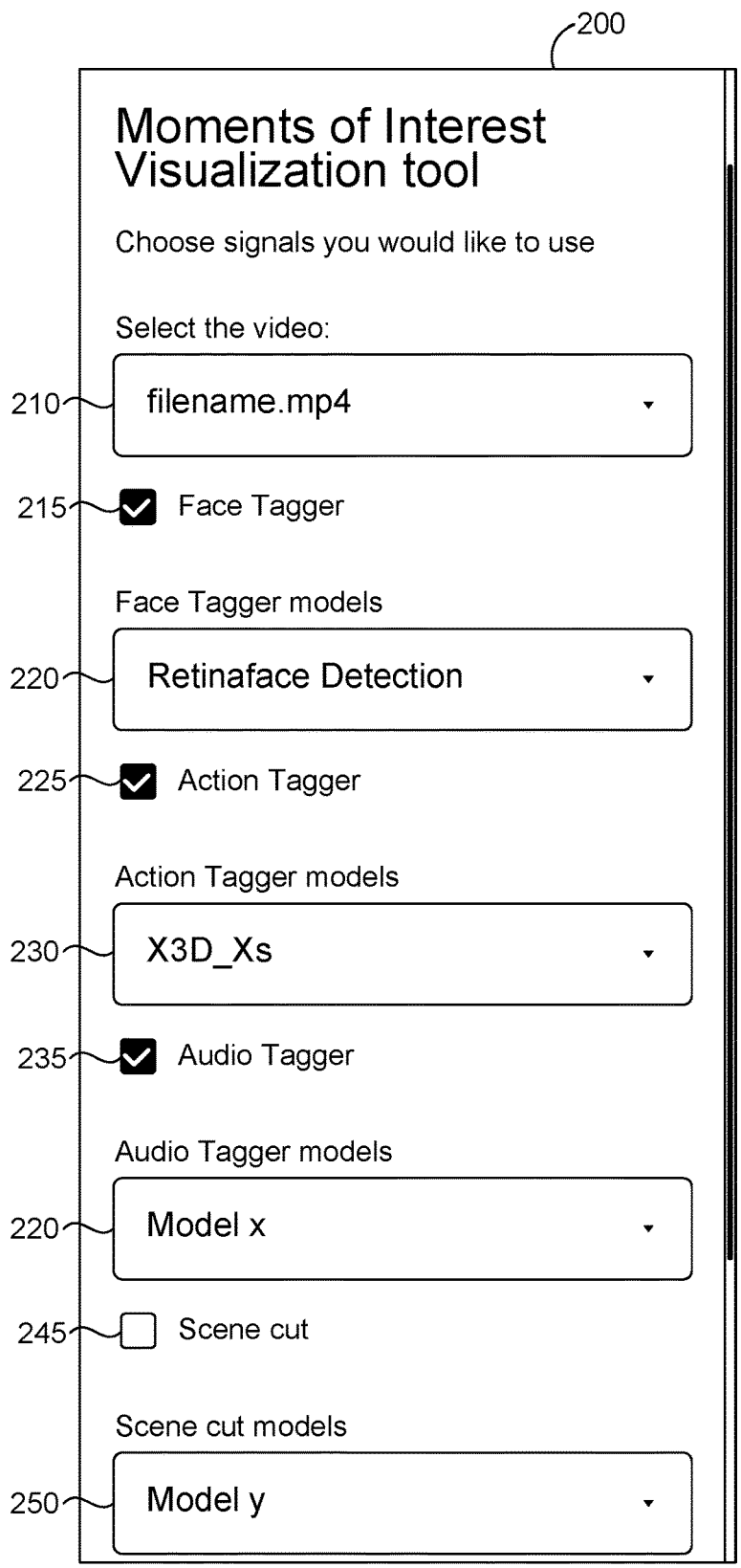
FIG. 2 is an illustration of an example user interface that configures parameters used to identify or extract moments of interest, in accordance with embodiments of the present invention.

For example, in some embodiments that allow a user to customize moments of interest, highlight parameter tool 120 provides one or more interaction elements (e.g., buttons, check boxes, drop down menus, sliders, etc.) that accept inputs selecting modalities of interest, machine learning models of interest, supported classes of interest (e.g., class tags), preferred class weights, modality weights, a freeform text query, and/or other parameters. By way of nonlimiting example, FIG. 2 illustrates an example user interface 200 that configures parameters used to identify or extract moments of interest, in accordance with embodiments of the present invention. In this example, user interface 200 includes dropdown menu 210 that allows a user to identify the video to be analyzed, check boxes 215, 225, 235, and 245 that allow a user to select which modalities to analyze (e.g., faces, actions, audio events, visual scenes, speech, objects, emotions, frame quality, etc.), and dropdown menus 220, 230, 240, and 250 that allow a user to select a particular machine learning model for a given modality. Although not depicted in the example in FIG. 2, in some embodiments, one or more interaction elements are provided that accept inputs selecting a set of supported classes (detectible by feature extraction component(s) 165 of FIG. 1), class weights, modality weights, and/or a freeform query. As such, some embodiments allow a user to customize the parameters used to identify or extract moments of interest.

Returning now to FIG. 1, in some embodiments, video highlights tool 115 and/or one of its constituent components cause one or more user interfaces (or a portion thereof) to present an interaction element that allows a user to trigger identification or extraction of moments of interest from a designated video (e.g., one of video files 192). In other scenarios, video highlights tool 115 triggers identification or extraction of moments of interest from a video automatically (e.g., in the background). In some embodiments, video highlights tool 115 triggers video highlights engine 155 to identify or extract of moments of interest from a particular video, and/or sends video highlights engine 155 a representation of one or more user-selected parameters.

In the embodiment illustrated in FIG. 1, video highlights engine 155 includes video processing tool 160, feature processing tool 170, heuristics tool 175, signal aggregator 180, video segment identifier 185. Generally, video processing tool 160 detects features from a video, feature processing tool 170 processes, extracts, or identifies relevant data from the detected features (e.g., corresponding to selected or desired classes), heuristics tool 175 applies logic or rules that convert the detected features and/or the data identified from the detected features into an importance score per frame for each model, signal aggregator 180 combines the importance scores for each model into an aggregated importance score per frame, and video segment identifier 185 uses the aggregated importance score per frame to identify, extract, and/or store a representation of video highlights 196 (e.g., video frames/segments of interest).

At a high level, video processing tool 160 (e.g., feature extraction component(s) 165) detects, extracts, or otherwise determines various features from a video, for example, using one or more machine learning models, natural language processing, digital signal processing, and/or other techniques. In some embodiments, feature extraction component(s) 165 include one or more machine learning models for each of a plurality of modalities (e.g., facial detection, object or action detection, audio event detection, visual scene detection, facial expression sentiment detection, speech sentiment detection, frame quality detection), and one or more of the machine learning models are configured to detect multiple classes of features (e.g., unique faces, different types of objects or actions, different types of audio events, different types of speech sentiment, etc.). In an example implementation, each machine learning model is part of its own processing branch or module that includes corresponding post-processing (e.g., by feature processing tool 170) and/or logic or rules (e.g., applied by heuristics tool 175) that generate an importance score per frame for that branch or module. Signal aggregator 180 combines the importance scores generated by each branch or module into an aggregated importance score per frame or other portion of a video.

Figure 3:
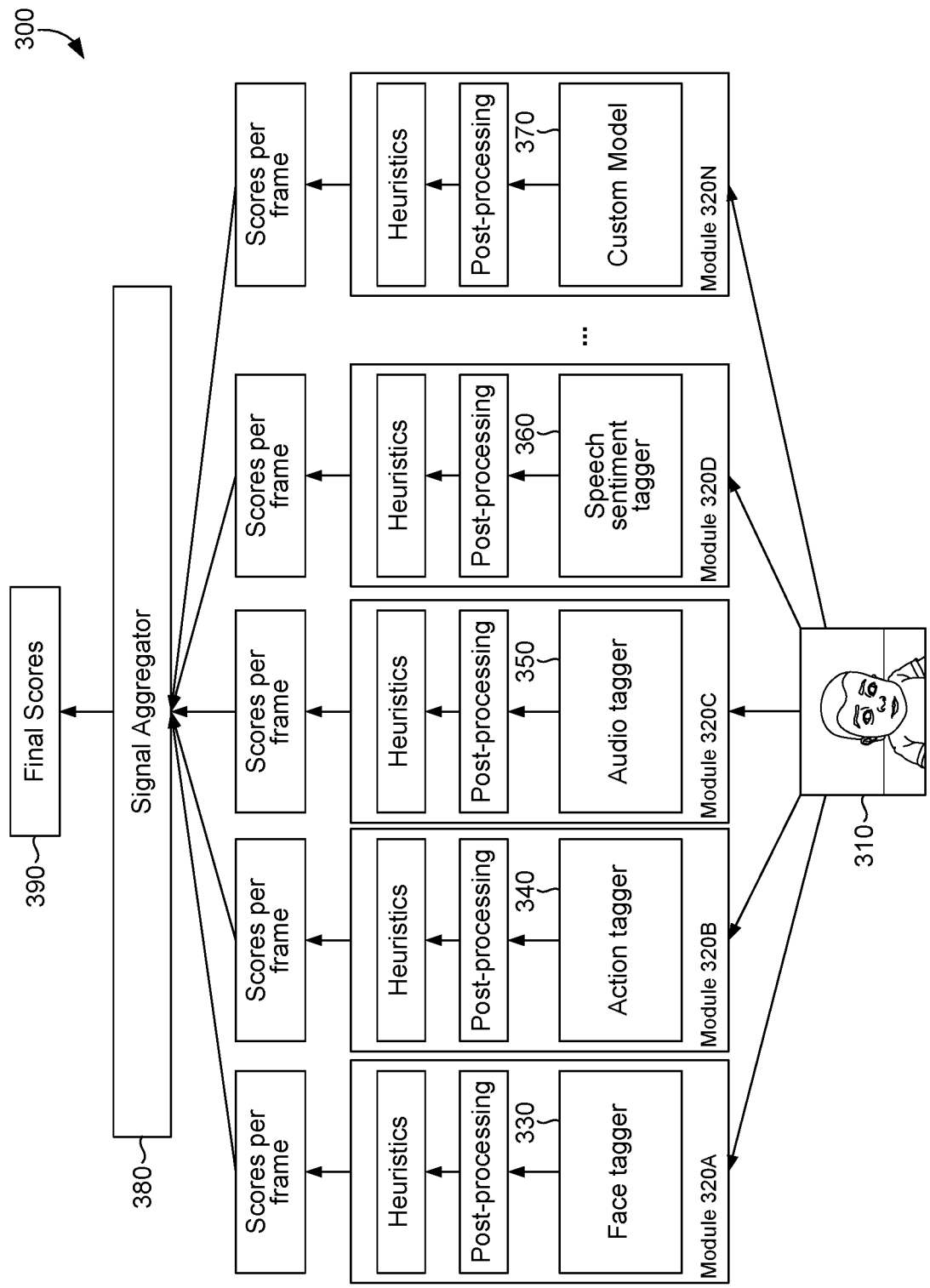
FIG. 3 is a data flow diagram illustrating an example technique for generating an aggregated importance score that quantifies importance of a portion of a video across multiple modalities, in accordance with embodiments of the present invention.

FIG. 3 illustrates is a data flow diagram illustrating an example technique 300 for generating an aggregated importance score that quantifies importance of a portion of a video (e.g., a video frame) across multiple modalities. In FIG. 3, example technique 300 starts with a video (represented by video frame 310), which is processed by modules 320A, 320B, 320C, 320D, . . . 320N, each of which includes a corresponding machine learning model (e.g., face tagger 330, action tagger 340, audio tagger 350, speech sentiment tagger 360, and custom model 370). Depending on the machine learning model and/or the implementation, each module evaluates one or more video frames at a time. In an example implementation, each of modules 320A, 320B, 320C, 320D, . . . , 320N includes corresponding post-processing and/or logic or rules that generate an importance score per frame for that branch or module, a corresponding signal representing the importance score per frame is generated and smoothed for each module, and signal aggregator 380 combines the importance scores generated by each module into final scores 390 (e.g., an aggregated importance score per frame).

Returning to FIG. 1, in some embodiments, feature extraction component(s) 165 include one or more machine learning models that are each part of their own processing branch or module (e.g., modules 320A, 320B, 320C, 320D, . . . 320N of FIG. 3). For example, some embodiments include one or more machine learning models that detect unique faces from video frames of a video (e.g., face tagger 330 of FIG. 3), detect objects or actions from video frames of a video (e.g., action tagger 340 of FIG. 3), detect audio events from an audio track associated with a video (e.g., audio tagger 350 of FIG. 3), detect speech sentiment from an audio track associated with a video (e.g., speech sentiment tagger 360 of FIG. 3), detect visually similar scenes from video frames of a video, detect emotion or sentiment from facial expressions on faces in video frames of a video, detect frame quality from video frames of a video, identify or quantify video frames that are relevant to a textual query, and/or others. Depending on the machine learning model and/or the implementation, different types of post-processing and/or logic or rules are applied (e.g., by feature processing tool 170 and/or heuristics tool 175) to generate a corresponding importance score per frame.

In some embodiments, feature extraction component(s) 165 include one or more machine learning models that detect unique faces from video frames of a video (e.g., face tagger 330 of FIG. 3). In an example implementation, any known face detection technique (e.g., RetinaFace) is applied to detect unique faces in each video frame and/or across time. For example, each video frame is processed by segmenting each face from the background (e.g., using one or more neural networks), aligning each face, detecting locations of facial landmarks (e.g., eyes, nose, mouth), and generating a (e.g., vector) representation of the detected facial landmarks. In some embodiments, detected faces from different frames (e.g., within a single video, across a collection of videos) and that have similar representations (e.g., separated by a distance within some threshold, clustered based on one or more clustering algorithms) are determined to belong to the same identity.

In some embodiments, for each video frame, feature processing tool 170 computes the number of detected faces in each video frame, sizes of detected faces (e.g., height, width, circumference, area, etc.) in each video frame, and/or proximity of detected faces each video frame (e.g., by computing pairwise distance in pixels to detected face centers for each pair in the frame, and averaging the pairwise distances). Additionally or alternatively, feature processing tool 170 ranks the most frequently appearing identities detected in the video, associates a representation of the rank of a detected identity with each video frame where the identity was detected, and/or drops other unneeded data.

In some embodiments, heuristics tool 175 generates an importance score per frame based on the number of detected faces in each frame (e.g., the more detected faces, the higher the score), size of detected faces in each frame (e.g., the larger the size of the detected faces, the higher the score), proximity of detected faces in each frame (e.g., the closer the detected faces, the higher the score), and/or appearance in the frame of identities that appear in the video most frequently (e.g., an appearance of more frequently appearing identities, the higher the score). In an example of importance scoring based on the number of detected faces in each frame, a frame with three or more detected faces is assigned a score of 1; a frame with two detected faces is assigned a score of 0.75; a frame with one detected face is assigned a score of 0.5; and a frame with no detected faces is assigned a score of 0. In an example of importance scoring based on the size of detected faces in each frame, the total area of all detected faces in a frame is summed, and the sum is divided by the total area of the frame to arrive at a score between 0 and 1 (e.g., a frame where a detected face takes up the entire frame would get a score of 1). In an example of importance scoring based on proximity of detected faces in each frame, the pairwise distance between centers of detected faces is computed for each pair of detected faces in the frame, the pairwise distances are averaged, and the averaged pairwise distance is normalized (e.g., by dividing by width or height of the frame) to arrive at a score between 0 and 1. In an example of importance scoring based on the appearance of a frequently appearing identity, the most frequently appearing identity is assigned a score of 1, the least frequently appearing identity is assigned a score of 0, and identities that appears with some intermediate frequency are assigned some intermediate score (e.g., between 0 and 1). For a given frame, the assigned scores for the identities in the detected frame are averaged to arrive at a score between 0 and 1 for the frame. In an example implementation, heuristics tool 175 computes different scores (e.g., from 0 to 1) for each of a plurality of factors and combines (e.g., averages) the scores to generate an importance score based on detected faces.

In some embodiments, feature extraction component(s) 165 include one or more machine learning models that detect actions from video frames of a video. Any known action recognition technique (e.g., X3D, movienet) is applied to visually extract instances of one or more classes of action from one or more video frames. In an example implementation, one or more neural network classifiers detect the presence of any number of action classes (e.g., low-level movement such as standing up, sitting down, walking, and talking; higher level events such dining, playing, and dancing; and/or others) in sequences of video frames (e.g., 8 seconds of video). In some embodiments, an importance score is generated per frame based on detecting instances of designated action classes and/or prediction confidence (e.g., the higher the prediction confidence, the higher the score). In an example implementation, classes of interest are designated (e.g., by design, default, user-selection), and feature processing tool 170 associates each detected instance of a designated action class and/or its confidence level (e.g., which quantifies prediction confidence or likelihood) with a corresponding frame in which the action was detected (e.g., tags the frame with a representation of each detected instance, its class, and/or its corresponding confidence level). For each designated action class, heuristics tool 175 identifies a designated weight (e.g., set by design choice, based on user-input). For each instance of a detected action (e.g., action tag) in a given frame, heuristics tool 175 multiplies the designated weight for that instance's action class by the predicted confidence level for that instance, and averages across all detected actions (action tags) associated with the frame to generate an importance score based on detected actions (e.g., between 0 and 1). In some embodiments where a user selects one or more action classes of interest, any frame with an associated action tag that matches a selected class is set to 1, and other frames are set to 0.

In some embodiments, feature extraction component(s) 165 include one or more machine learning models that detect objects from video frames of a video. Any known object recognition technique is applied to visually extract one or more classes of object from one or more video frames. In an example implementation, one or more neural network classifiers detect the presence of any number of object classes (e.g., hundreds, thousands, etc.) in each video frame. In some embodiments, an importance score is generated per frame based on detecting instances of designated object classes and/or prediction confidence (e.g., the higher the prediction confidence, the higher the score). In an example implementation, classes of interest are designated (e.g., by design, default, user-selection), and feature processing tool 170 associates each detected instance of a designated object class and/or its confidence level with a corresponding frame in which the object was detected (e.g., tags the frame with a representation of each detected instance, its class, and/or its corresponding confidence level). For each designated object class, heuristics tool 175 identifies a designated weight (e.g., set by design choice, based on user-input). For each instance of a detected object (e.g., object tag) in a given frame, heuristics tool 175 multiplies the designated weight for that instance's object class by the predicted confidence level for that instance, and averages across all detected objects (object tags) associated with the frame to generate an importance score based on detected objects (e.g., between 0 and 1). In some embodiments where a user selects one or more object classes of interest, any frame with an associated object tag that matches a selected class is set to 1, and other frames are set to 0.

In some embodiments, feature extraction component(s) 165 include one or more machine learning models that detect audio events from an audio track associated with a video (e.g., audio tagger 350 of FIG. 3). Any known sound recognition technique is applied to detect any number of audio event classes (e.g., alarm, laughter, ringing, applause, coughing, buzzing, horn, barking, gun shot, siren, etc.). In an example implementation, each frame of audio data from the audio track is encoded into a vector representation (e.g., using linear predictive coding) and classified by one or more neural networks. In some embodiments, an importance score is generated per frame based on detecting instances of designated audio event classes and/or prediction confidence (e.g., the higher the prediction confidence, the higher the score). In an example implementation, classes of interest are designated (e.g., by design, default, user-selection), and feature processing tool 170 associates each detected instance of a designated audio event class and/or its confidence level with each video frame corresponding to the audio where the audio event was detected (e.g., tags the frame with a representation of each detected instance, its class, and/or its corresponding confidence level). For each designated audio event class, heuristics tool 175 identifies a designated weight (e.g., set by design choice, based on user-input). For each instance of a detected audio class (e.g., audio event tag) associated with a given frame, heuristics tool 175 multiplies the designated weight for that instance's audio event class by the predicted confidence level for that instance, and averages across all detected audio events (audio event tags) associated with the frame to generate an importance score based on detected audio events (e.g., between 0 and 1). In some embodiments where a user selects one or more audio event classes of interest, any frame with an associated audio event tag that matches a selected class is set to 1, and other frames are set to 0.

In some embodiments, feature extraction component(s) 165 include one or more machine learning models that detect facial emotion from video frames of a video. Any known visual recognition technique is applied to visually extract one or more classes of emotion or sentiment from facial expressions in one or more video frames. In an example implementation, one or more neural network classifiers detect the presence of any number of facial emotion or sentiment classes (e.g., happy, sad, anger, disgust, fear, surprise) from each video frame (e.g., from detected faces in each video frame). In some embodiments, an importance score is generated per frame based on detecting instances of designated facial emotion or sentiment classes and/or prediction confidence (e.g., the higher the prediction confidence, the higher the score). In an example implementation, classes of interest are designated (e.g., by design, default, user-selection), and feature processing tool 170 associates each detected instance of a designated facial emotion or sentiment class and/or its confidence level with a corresponding frame in which the facial emotion or sentiment was detected (e.g., tags the frame with a representation of each detected instance, its class, and/or its corresponding confidence level). For each designated facial emotion or sentiment class, heuristics tool 175 identifies a designated weight (e.g., set by design choice, based on user-input). For each instance of a detected facial emotion or sentiment (e.g., facial emotion tag) in a given frame, heuristics tool 175 multiplies the designated weight for that instance's facial emotion or sentiment class by the predicted confidence level for that instance, and averages across all detected facial emotions or sentiments (facial emotion tags) associated with the frame to generate an importance score based on detected facial emotion or sentiment (e.g., between 0 and 1). In some embodiments where a user selects one or more facial emotion or sentiment classes of interest, any frame with an associated facial emotion tag that matches a selected class is set to 1, and other frames are set to 0.

In some embodiments, feature extraction component(s) 165 include one or more machine learning models that detect speech sentiment from an audio track associated with a video or from a transcript of speech in the audio track (e.g., speech sentiment tagger 360 of FIG. 3). Any known speech sentiment recognition technique is applied to detect any number of speech sentiment classes (e.g., positive, negative, happy, sad, anger, disgust, fear, surprise). In an example implementation, each (e.g., 4 second) frame of audio data from the audio track is encoded into a (e.g., vector) representation and classified by one or more neural networks (e.g., a speech sentiment model). Additionally or alternatively, in some embodiments, any known speech recognition technique (e.g., speech-to-text algorithm) is applied to extract a transcript from an audio track associated with a video, and text from the transcript is encoded into a (e.g., vector) representation and classified by one or more neural networks (e.g., a speech sentiment model). In some embodiments, an importance score is generated per frame based on detecting instances of designated speech sentiment classes, detecting particular speech sentiment (e.g., higher scores for positive speech sentiment than negative speech sentiment), and/or prediction confidence (e.g., the higher the prediction confidence, the higher the score). In some embodiments, classes of interest are designated (e.g., by design, default, user-selection) and a weighted average across detected instances is used to generate an importance score based on detected speech emotion or sentiment. In an example implementation using a binary classification between positive and negative speech sentiment, video frames corresponding to speech that was classified with a positive sentiment are set to 1, and video frames corresponding to speech that was classified with a negative sentiment are set to 0. In some embodiments where a user selects one or more speech emotion or sentiment classes of interest, any frame with an associated speech sentiment tag that matches a selected class is set to 1, and other frames are set to 0.

In some embodiments, feature extraction component(s) 165 include one or more machine learning models that detect visually similar scenes from video frames of a video. In an example implementation, each video frame is processed (e.g., by one or more neural networks) to extract a corresponding (e.g., vector) representation of visual features in the video frame, and feature processing tool 170 clusters the representations of the different video frames across time into a (e.g., fixed or variable) number of visual scenes using any suitable clustering algorithm (e.g., k-means clustering). In some embodiments, an importance score is generated per frame based on detecting scene cuts and/or prediction confidence (e.g., higher scores for detected scene cuts). In an example implementation, heuristics tool 175 assigns each video frame corresponding to a detected scene transition a relatively high importance score (e.g., 1), and assigns other video frames a relatively lower importance score (e.g., 0).

In some embodiments, feature extraction component(s) 165 include one or more machine learning models that detect visual frame quality from video frames of a video. In an example implementation, each video frame is processed (e.g., by one or more neural networks) to predict a measure of one or more classes of visual quality (e.g., frame quality, face quality) from one or more video frames. In an example implementation, the predicted measure is higher for higher quality and lower for lower quality (e.g., a score between 0 to 1, with 0 indicating low visual quality such as blur and 1 indicating high visual quality such as high resolution). In some embodiments, feature processing tool 170 and/or heuristics tool 175 assigns a predicted measure of visual quality (or a normalized measure of predicted visual quality) as an importance score for a corresponding frame, and/or combines (e.g., averages) predicted measures of multiple classes of visual quality to generate an importance score for a corresponding frame.

In some embodiments, feature extraction component(s) 165 include one or more machine learning models that detect video frames that are relevant to a freeform query. In an example implementation, a freeform textual query is encoded into a textual embedding, a video frame is visually encoded into a visual embedding, and the textual and visual embeddings are decoded and classified to generate a binary prediction of whether the video frame is relevant to the query. In some embodiments, an importance score is generated per frame based on based on cosine similarity between the visual and textual embedding, predicted relevance, and/or prediction confidence (e.g., the importance score equals the cosine similarity; the higher the prediction confidence, the higher the score, etc.). In an example implementation, heuristics tool 175 assigns a relatively higher importance score per frame (e.g., 1) for frames that are predicted to be relevant to a query, and assigns a relatively lower importance score per frame (e.g. 0) for frames that are predicted not to be relevant to the query.

The preceding paragraphs describe various example machine learning models used in certain embodiments, but some embodiments additionally or alternatively implement other machine learning models (e.g., custom model 370 of FIG. 3). Returning now to the embodiment illustrated in FIG. 3, each model is part of its own module that generates an importance score per frame for that module (e.g., for a corresponding modality). In some embodiments, for each module (model), the corresponding importance scores per frame are used to generate a signal (e.g., importance score vs. frame), and the signal is smoothed to reduce noise. Any suitable smoothing or noise reduction technique is applied to any or all of the signals from the different modules. In an example implementation, one or more of the signals are smoothed by convolving each signal with a Gaussian kernel. The signals from the different modules (e.g., the unsmoothed and/or smooth signals) are fed into signal aggregator 380 and combined to generate final scores 390.

Figure 4:
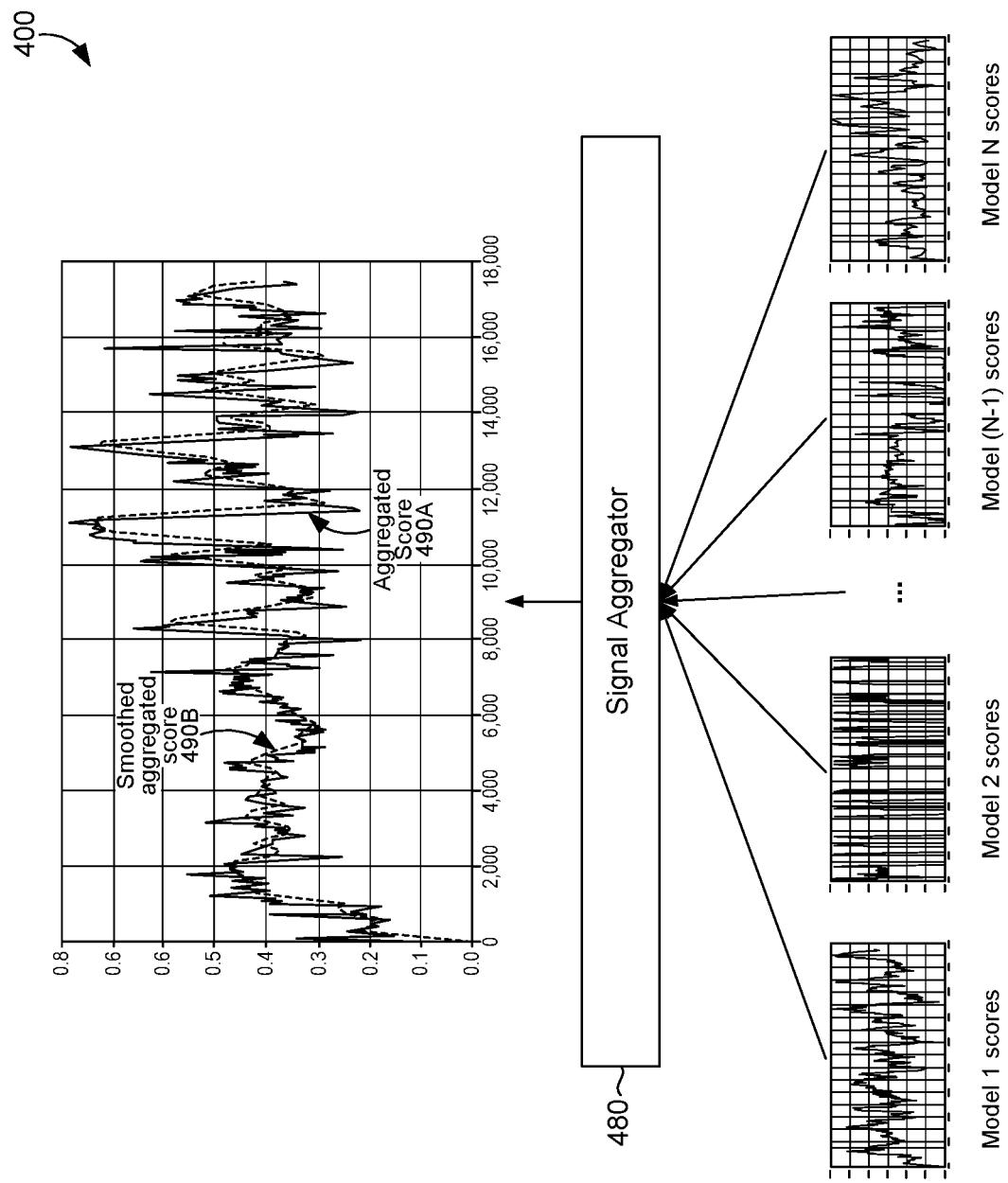
FIG. 4 is a data flow diagram illustrating an example technique for aggregating importance scores across multiple modalities, in accordance with embodiments of the present invention.

FIG. 4 illustrates an example technique 400 for aggregating importance scores across multiple modalities, in accordance with embodiments of the present invention. In FIG. 4, signal aggregator 480 (e.g., which in some embodiments corresponds to signal aggregator 380 of FIG. 3 and/or signal aggregator 180 of FIG. 1) fuses signals (importance score vs. frame) from different models and/or modules to generate an aggregated importance score per frame (e.g., aggregated score 490A and smoothed aggregated score 490B). In FIG. 4, aggregated score 490A and smoothed aggregated score 490B are shown plotted against frame number (e.g., ~18,000 frames at 30 frames per second would represent a ~10 hour video).

Depending on the implementation, signal aggregator 480 uses various techniques to combine signals from different modules. In one example, the maximum importance score per frame is taken as the aggregated importance score for the frame. In another example, the different scores for each frame are combined (e.g., by averaging the different scores per frame, applying a particle filter to determine a filtered value per frame, using a neural network to determine a combined score per frame). For example, a weighted average is performed across the different scores for each frame using weights (e.g., designated by design, default, user-selection) to generate the aggregated importance score for the frame. In another example, a neural network is trained to fuse the different scores into a combined score per frame using user feedback about generated moments of interest as ground truth (e.g., inputs confirming whether or not moments of interest generated using the neural network are actually of interest to a particular user). These are just a few examples, and other ways of combining importance scores into an aggregated importance score are contemplated within the scope of the present disclosure.

Returning now to FIG. 1, in some embodiments, video segment identifier 185 uses aggregated importance scores to identify and/or generate moments of interest (e.g., video frames and/or segments of interest) in the video. In an example embodiment, video segment identifier 185 identifies each video frame with an aggregated importance score above some threshold (e.g., 0.6) as a moment of interest. In another example, video segment identifier 185 identifies a video segment that encompasses each video frame with an aggregated importance score above some threshold (e.g., a video segment with a minimum duration like 2 or 4 seconds, centered on or around a peak score or cluster of scores above a threshold, etc.). In another example, video segment identifier 185 identifies a video segment with a particular duration (e.g., 4 or 6 seconds) from each minute of video, and for each minute, video segment identifier 185 identifies the video frame with the peak aggregated importance score and trims a corresponding video segment (e.g., centered on the peak value) to that duration.

In yet another example, video segment identifier 185 implements dynamic programming to identify video segments of interest. In some embodiments, video segment identifier 185 weights longer video segments higher (e.g., through a maximum segmentation duration, such as 20 seconds). More specifically, in some embodiments, video segment identifier 185 identifies candidate video segments having different durations up to a maximum duration (e.g., 1-20 second clips), averages the aggregated importance scores across the frames in each candidate video segment to generate an importance score for the candidate video segment, combines (e.g., averages) the importance score with a duration score for the candidate video segment, and identifies candidate video segments with the highest combined scores. In some embodiments, video segment identifier 185 calculates a duration score for each candidate video segment by dividing the video segment's duration by the maximum duration of all the candidate video segments to arrive at a normalized score (e.g., between 0 and 1). Video segment identifier 185 combines the importance and duration scores and to generate a combined score for each candidate video segment, sorts the scores, and identifies the candidate video segments with the highest combined scores as video segments of interest. In an example implementation, video segment identifier 185 accumulates video segments of interest until their cumulative duration adds up to (e.g., is equal to or greater than) some designated duration of video segments (e.g., 1 minute).

In some embodiments, video segment identifier 185 (or some other component) generates a representation of identified moments of interest (e.g., video highlights 196) using one or more data structures. In an example implementation, video frames and/or video segments of interest are identified by values that represent, or references to, timeline locations (e.g., frame locations or IDs, segment boundary locations or IDs, etc.), segment durations, and/or other representations. In some cases, video segment identifier 185 extracts the one or video segments of interest from the video file and creates a new file that includes only the extracted video segments of interest, and/or creates a new file for each extracted video segment of interest. In some cases, a single copy of a particular video and a representation of boundary locations for one or more video segments of interest in the video are maintained, and/or a particular video file is broken up into fragments at boundary locations of the video segments video segments of interest for efficiency purposes.

Depending on the embodiment, the identified moments of interest (e.g., video highlights 196) are used in various ways. In some embodiments, video summarization tool 125 causes one or more user interfaces to display or otherwise make a representation of video highlights 196 available for viewing, playback, editing, downloading, sharing to social media or some other internet location, etc. In another example, video browsing tool 130 causes display of one or more user interfaces (e.g., a playback or editing timeline) that provide functionality for browsing or visualizing video highlights 196 within the video. By way of nonlimiting example, video browsing tool 130 updates a video timeline (e.g., a playback or editing timeline) to include a visual representation of video highlights 196 (e.g., flags representing timeline locations of peak scores and/or start/stop times of video segments of interest, thumbnails at timeline locations of peak scores and/or start times of video segments of interest).

In yet another example, video file manager 135 causes display of one or more user interfaces that provide functionality for browsing or searching multiple videos (video files 192) based on aggregated importance scores and/or identified video highlights 196 within the videos. In an example implementation, video file manager 135 accepts input toggling a highlights search filter that triggers searching, filtering, or otherwise displaying a representation of videos with one or more identified moments of interest (whether based on default parameters or user-selected video search parameters), such as a list of videos that contain identified moments of interest, or a list of the moments themselves. In some cases, video file manager 135 causes a user interface such as a dashboard to visually represents importance scores (e.g., peak score per video, peak score for video segment, score per frame). In some cases, video file manager 135 sorts and/or tranches matching videos or moments of interest by score (e.g., high scores, medium scores, low scores). In some embodiments, video file manager 135 causes a user interface to visually represent matching videos or moments of interest with one or more thumbnails corresponding to peak scores and/or start times of moments of interest. Additionally or alternatively, when a video is selected, video file manager 135 causes a user interface to display a preview of one or more identified moments of interest in the video (e.g., by displaying one or more thumbnails, or otherwise previewing the moment of interest). These are just a few examples and other implementations are contemplated within the scope of the present disclosure.

Example Flow Diagrams

Figure 5:
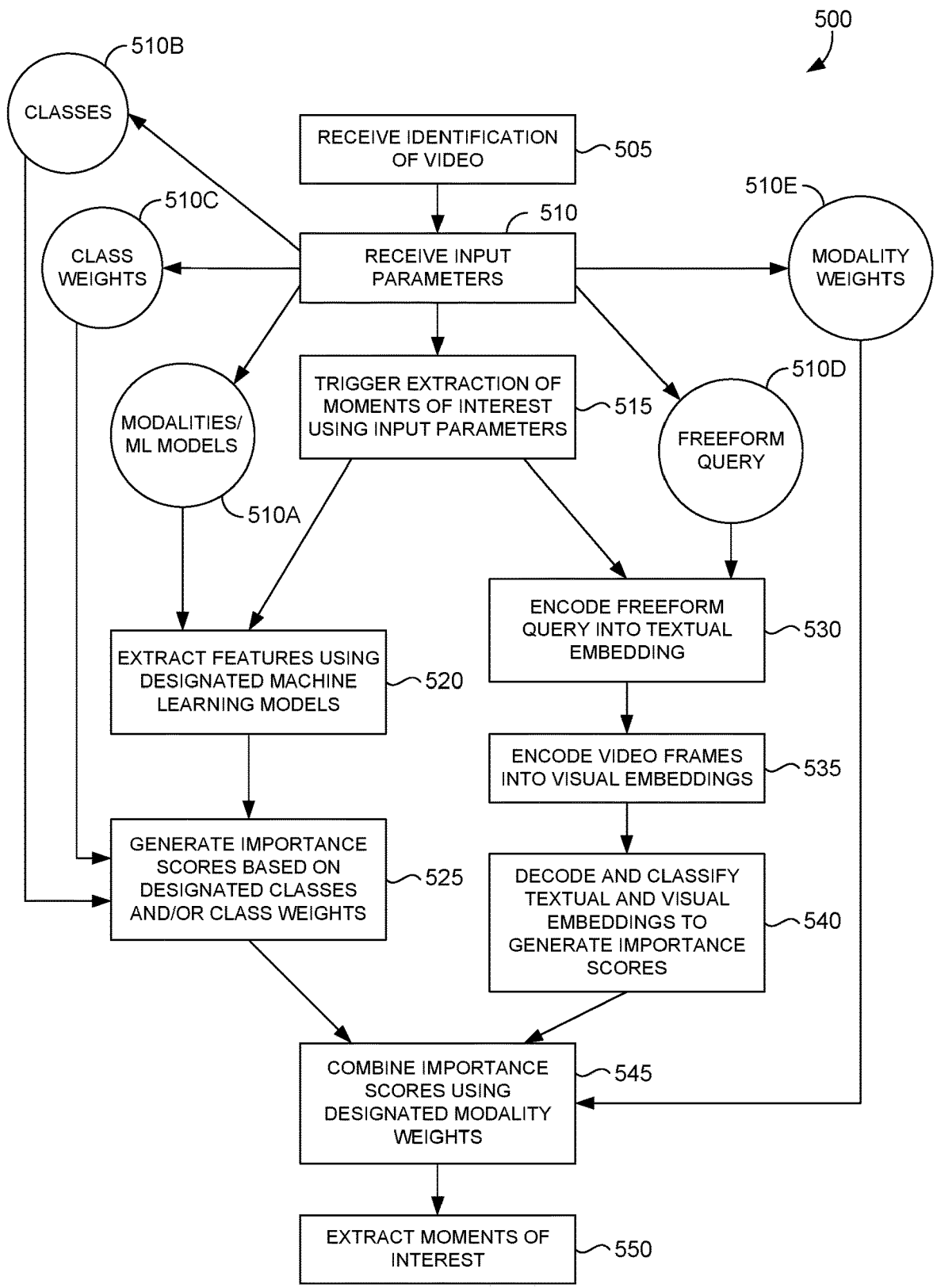
FIG. 5 is a flow diagram showing a method for extracting moments of interest from a video based on received input parameters, in accordance with embodiments of the present invention.
Figure 6:
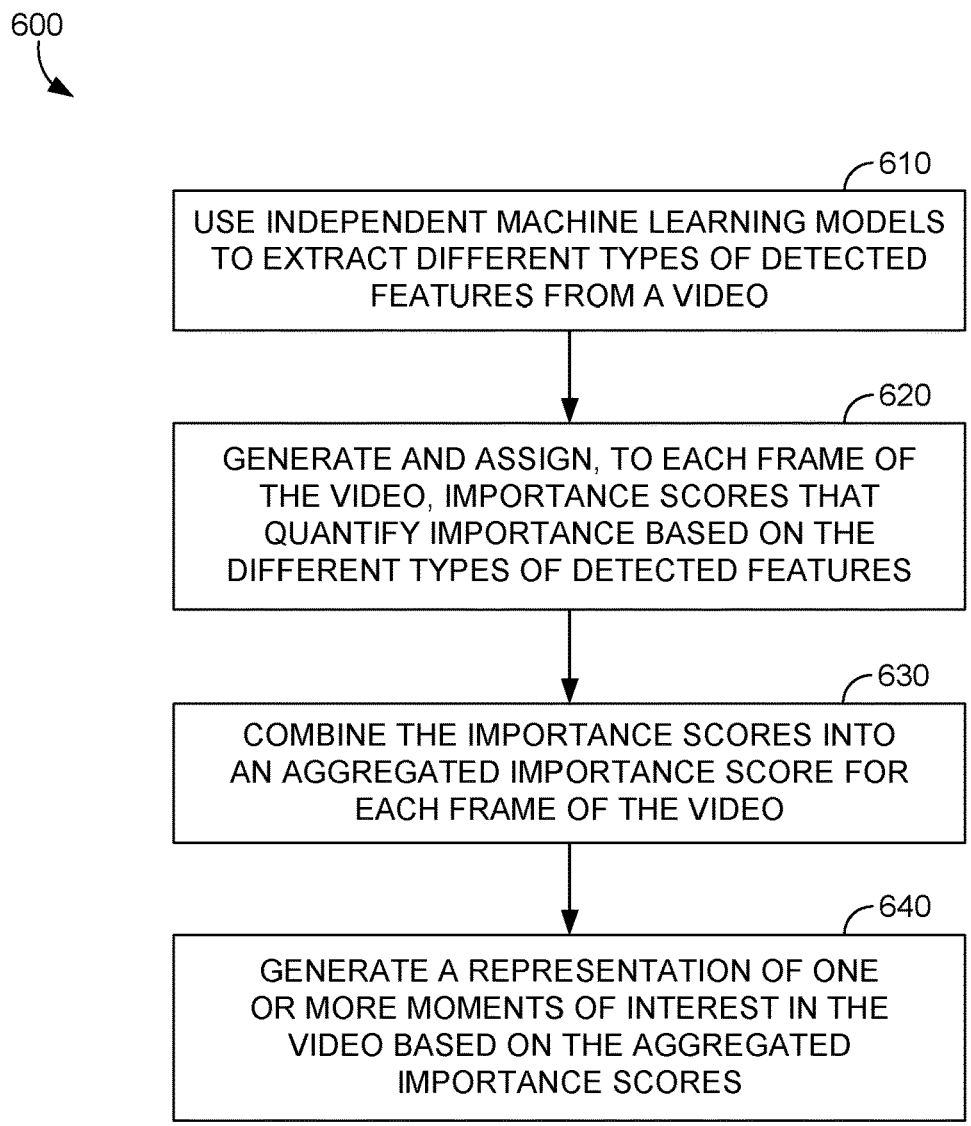
FIG. 6 is a flow diagram showing a method for identifying one or more moments of interest using independent machine learning models, in accordance with embodiments of the present invention.
Figure 7:
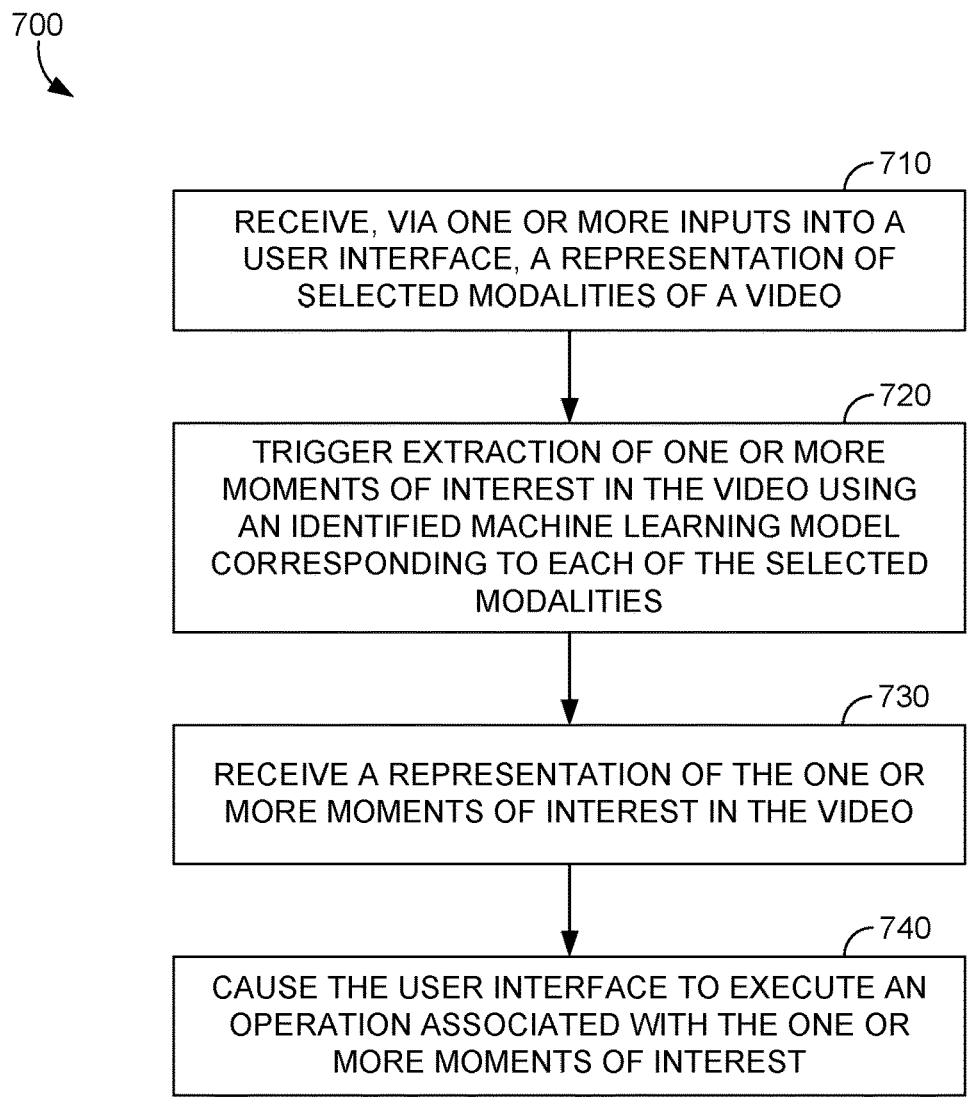
FIG. 7 is a flow diagram showing a method for triggering extraction of one or more moments of interest based on selected modalities of a video, in accordance with embodiments of the present invention.

With reference now to FIGS. 5-7, flow diagrams are provided illustrating methods for identifying or extracting moments of interest from a video. Each block of the methods 500, 600, and 700 and any other methods described herein comprise a computing process performed using any combination of hardware, firmware, and/or software. For instance, in some embodiments, various functions are carried out by a processor executing instructions stored in memory. In some cases, the methods are embodied as computer-usable instructions stored on computer storage media. In some implementations, the methods are provided by a standalone application, a service or hosted service (standalone or in combination with another hosted service), or a plug-in to another product, to name a few.

Turning initially to FIG. 5, FIG. 5 illustrates a method 500 for extracting moments of interest from a video based on received input parameters, in accordance with embodiments described herein. Initially at block 505, an identification of a video is received (e.g., via a user interface controlled by video highlights tool 115 of FIG. 1). At block 510, any number of input parameters are received (e.g., via a user interface controlled by video highlights tool 115 of FIG. 1). FIG. 5 illustrates an example embodiment in which the input parameters represent a selection or indication of designated modalities and/or machine learning models 510A (e.g., via check boxes or drop down menus), supported classes 510B (e.g., via check boxes or drop down menus), class weights 510C (e.g., via sliders), a freeform query 510D (e.g., via a text box), and/or modality weights 510E (e.g., via sliders).

At block 515, extraction of moments of interest is triggered using the input parameters. For example, separate processing branches are triggered to generate corresponding importance scores. In FIG. 5, separate processing branches are represented by blocks 520-525. At block 520, features are extracted using designated machine learning models. In some embodiments in which the input parameters include designated machine learning models 510A, the designated machine learning models are used to extract features from the video. In some embodiments in which the input parameters include designated modalities 510A without an express designation of corresponding machine learning models, the machine learning models are identified by association with the designated modalities 510A. At block 525, importance scores are generated based on designated classes and/or class weights. In some embodiments in which the input parameters include designated classes 510B, for each designated class, a designated weight is identified (e.g., by heuristics tool 175) to prioritize that class over non-designated classes. In some cases, the input parameters include designated class weights 510C. In some cases, class weights are designated by design. By way of nonlimiting example, taking an example modality and machine learning model, for each instance of a detected class associated with a given video frame, the designated weight for that instance's class is multiplied by the predicted confidence level for that instance, and averaged across all detected instances of designated classes associated with the frame to generate an importance score.

In FIG. 5, another processing branch is represented by blocks 530-540. At block 530, freeform query 510D is encoded into a textual embedding. At block 535, each video frame of the video is encoded into a corresponding visual embedding. At block 540, the textual embedding and the visual embedding for each frame are used to generate an importance score for each frame. In an example embodiment, an importance score per frame is calculated as the cosine similarity between the textual embedding and the visual embedding.

At block 545, the importance scores generated by each of the processing branches are combined into aggregated importance scores using designated modality weights (e.g., by signal aggregator 180 of FIG. 1). In some embodiments in which the input parameters include designated modality weights 510E, the designated modality weights 510E are used in a weighted average to weight the individual importance scores for each model. In some embodiments, the designated modality weights are equal, and the combination amounts to an average of the importance scores for the different modalities. Finally, at block 550, one or more moments of interest are extracted or otherwise identified based on the aggregated importance scores (e.g., by video segment identifier 185 of FIG. 1).

Turning now to FIG. 6, FIG. 6 illustrates a method 600 for identifying one or more moments of interest using independent machine learning models, in accordance with embodiments described herein. Initially at block 610, independent machine learning models are used to extract different types of detected features from a video. At block 620, importance scores that quantify importance based on the different types of detected features are generated and assigned to each frame of the video. At block 630, the importance scores are combined into an aggregated importance score for each frame of the video. At block 640, a representation of one or more moments of interest in the video is generated based on the aggregated importance scores.

Turning now to FIG. 7, FIG. 7 illustrates a method 700 for triggering extraction of one or more moments of interest based on selected modalities of a video, in accordance with embodiments described herein. Initially at block 710, a representation of selected modalities of a video is received via one or more inputs into a user interface. At block 720, extraction of one or more moments of interest in the video is triggered. The extraction uses an identified machine learning model corresponding to each of the selected modalities. At block 730, a representation of the one or more moments of interest in the video is received. At block 740, the user interface is caused to execute an operation associated with the one or more moments of interest.

Example Operating Environment

Figure 8:
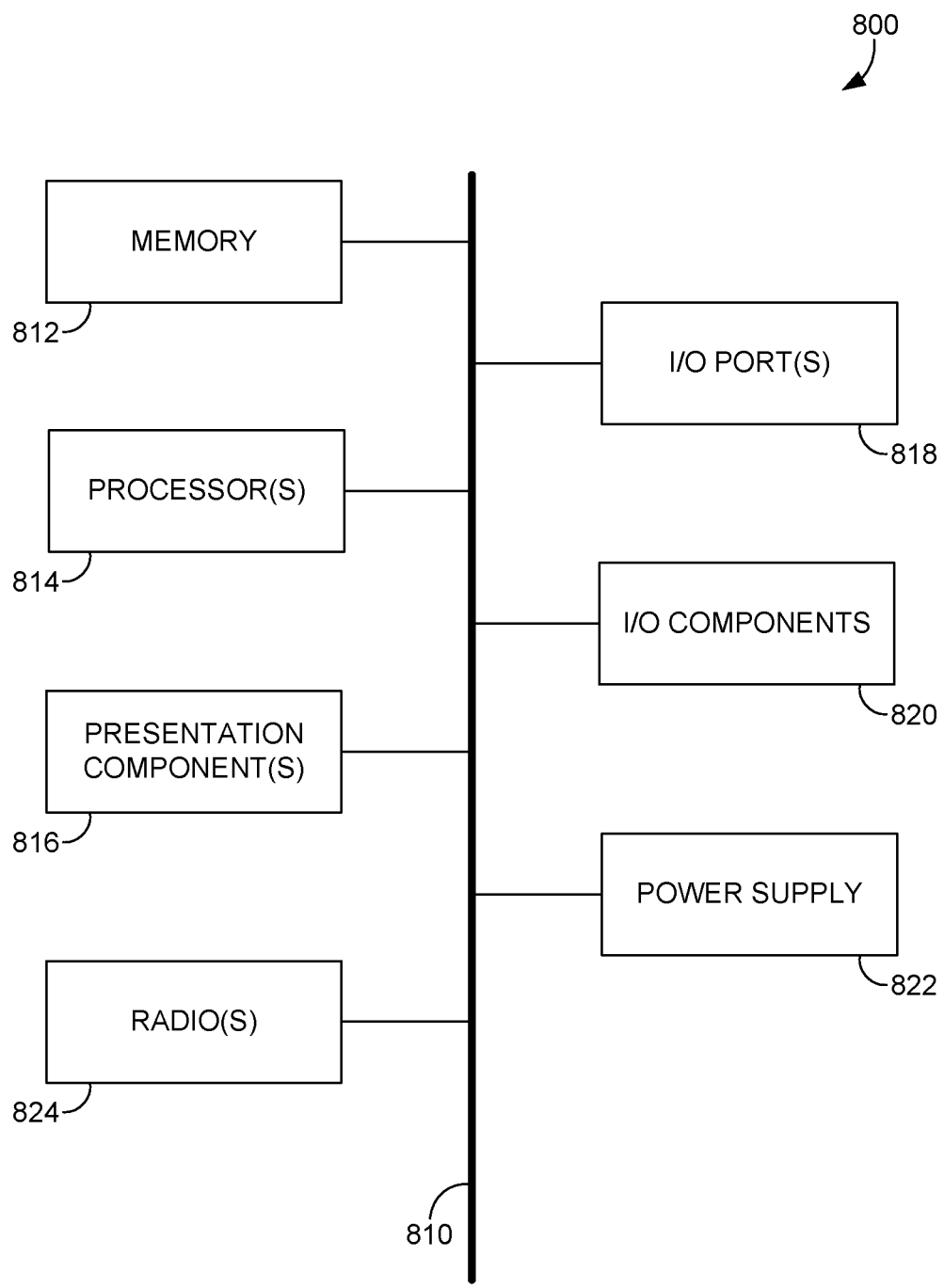
FIG. 8 is a block diagram of an example computing environment suitable for use in implementing embodiments of the present invention.

Having described an overview of embodiments of the present invention, an example operating environment in which some embodiments of the present invention are implemented is described below in order to provide a general context for various aspects of the present invention. Referring now to FIG. 8 in particular, an example operating environment for implementing embodiments of the present invention is shown and designated generally as computing device 800. Computing device 800 is but one example of a suitable computing environment and is not intended to suggest any limitation as to the scope of use or functionality of the invention. Neither should computing device 800 be interpreted as having any dependency or requirement relating to any one or combination of components illustrated.

In some embodiments, the present techniques are embodied in computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. Various embodiments are practiced in a variety of system configurations, including hand-held devices, consumer electronics, general-purpose computers, more specialty computing devices, etc. Some implementations are practiced in distributed computing environments where tasks are performed by remote-processing devices that are linked through a communications network.

With reference to the example operating environment illustrated in FIG. 8, computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what may be one or more busses (such as an address bus, data bus, or combination thereof). Although the various blocks of FIG. 8 are shown with lines for the sake of clarity, in some cases, it is not possible to delineate clear boundaries for different components. In this case, metaphorically, the lines would be grey and fuzzy. As such, the diagram of FIG. 8 and other components described herein should be understood as merely illustrative of various example implementations, such as an example computing device implementing an embodiment or a portion thereof. Distinction is not made between such categories as "workstation," "server," "laptop," "hand-held device," etc., as all are contemplated within the scope of FIG. 8 and a "computing device."

Computing device 800 typically includes a variety of computer-readable media. Computer-readable media can be any available media that can be accessed by computing device 800 and includes both volatile and nonvolatile media, and removable and non-removable media. By way of non-limiting example, in some cases, computer-readable media comprises computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer-storage media in the form of volatile and/or nonvolatile memory. In various embodiments, the memory is removable, non-removable, or a combination thereof. Example hardware devices include solid-state memory, hard drives, optical-disc drives, etc. Computing device 800 includes one or more processors that read data from various entities such as memory 812 or I/O components 820. Presentation component(s) 816 present data indications to a user or other device. Example presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. The I/O components 820 may provide a natural user interface (NUI) that processes air gestures, voice, or other physiological inputs generated by a user. In some instances, inputs are transmitted to an appropriate network element for further processing. In some embodiments, an NUI implements any combination of speech recognition, stylus recognition, facial recognition, biometric recognition, gesture recognition both on screen and adjacent to the screen, air gestures, head and eye tracking, and/or touch recognition (as described in more detail below) associated with a display of computing device 800. In some cases, computing device 800 is equipped with depth cameras, such as stereoscopic camera systems, infrared camera systems, RGB camera systems, touchscreen technology, and combinations of these, for gesture detection and recognition. Additionally or alternatively, the computing device 800 is equipped with accelerometers or gyroscopes that enable detection of motion, and in some cases, an output of the accelerometers or gyroscopes is provided to the display of computing device 800 to render immersive augmented reality or virtual reality.

Embodiments described herein support identifying and extracting moments of interest. The components described herein refer to integrated components of a video processing system. The integrated components refer to the hardware architecture and software framework that support functionality using the video processing system. The hardware architecture refers to physical components and interrelationships thereof and the software framework refers to software providing functionality that can be implemented with hardware embodied on a device.

In some embodiments, the end-to-end software-based system operates within the components of the video processing system to operate computer hardware to provide system functionality. At a low level, hardware processors execute instructions selected from a machine language (also referred to as machine code or native) instruction set for a given processor. The processor recognizes the native instructions and performs corresponding low-level functions relating, for example, to logic, control and memory operations. In some cases, low-level software written in machine code provides more complex functionality to higher levels of software. As used herein, computer-executable instructions includes any software, including low-level software written in machine code, higher level software such as application software and any combination thereof. In this regard, system components can manage resources and provide services for the system functionality. Any other variations and combinations thereof are contemplated with embodiments of the present invention.

Some embodiments are described with respect a neural network, a type of machine-learning model that learns to approximate unknown functions by analyzing example (e.g., training) data at different levels of abstraction. Generally, neural networks model complex non-linear relationships by generating hidden vector outputs along a sequence of inputs. In some cases, a neural network includes a model of interconnected digital neurons that communicate and learn to approximate complex functions and generate outputs based on a plurality of inputs provided to the model. In various implementations, a neural network includes any of a variety of deep learning models, including convolutional neural networks, recurrent neural networks, deep neural networks, and deep stacking networks, to name a few examples. In some embodiments, a neural network includes or otherwise makes use of one or more machine learning algorithms to learn from training data. In other words, a neural network can include an algorithm that implements deep learning techniques such as machine learning to attempt to model high-level abstractions in data.

Although some implementations are described with respect to neural networks, some embodiments are implemented using other types of machine learning model(s), such as those using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. For purposes of this disclosure, words such as "a" and "an," unless otherwise indicated to the contrary, include the plural as well as the singular. Thus, for example, the requirement of "a feature" is satisfied where one or more features are present.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computerized method comprising:
receiving, via one or more inputs into a user interface, a representation of selected modalities of a video;
triggering extraction of one or more moments of interest in the video using an identified machine learning model corresponding to each of the selected modalities, the identified machine learning model being identified from among a plurality of independent machine learning models designated to extract different features from videos;
receiving a representation of the one or more moments of interest in the video; and
causing the user interface to execute an operation associated with the one or more moments of interest.

2. The computerized method of claim 1, wherein the representation of the one or more moments of interest in the video corresponds to a summary video that includes only the one or more moments of interest, wherein the operation associated with the one or more moments of interest comprises a download or an upload of the summary video.

3. The computerized method of claim 1, wherein the operation associated with the one or more moments of interest comprises updating a video timeline, that provides a browsing functionality, with a visual representation of the one or more moments of interest.

4. The computerized method of claim 1, wherein the operation associated with the one or more moments of interest comprises a search for videos that have one or more identified moments of interest.

5. The computerized method of claim 1, further comprising receiving, via the one or more inputs into the user interface, a representation of selected classes, wherein the extraction of the one or more moments of interest in the video comprises setting corresponding class weights that prioritize the selected classes over other supported classes.

6. The computerized method of claim 1, further comprising receiving, via the one or more inputs into the user interface, a representation of a freeform text query, wherein the extraction of the one or more moments of interest comprises:
 encoding the freeform text query into a textual embedding;
 encoding each frame of the video into a visual embedding; and
 generating a set of importance scores based on cosine similarity between the textual embedding and the visual embedding for each frame.

7. The computerized method of claim 1, wherein the extraction of the one or more moments of interest comprises identifying video segments with frames that have corresponding aggregated importance scores above a threshold, the aggregated importance score determined from output scores corresponding to different modalities of the video generated using multiple machine learning models according to the selected modalities.

8. The computerized method of claim 1, wherein the extraction of the one or more moments of interest comprises using dynamic programming to accumulate video segments of the video up to a designated duration.

9. The computerized method of claim 1, wherein the extraction of the one or more moments of interest comprises generating a signal of importance scores for each of the selected modalities and smoothing the signal by convolving the signal with a Gaussian kernel.

10. One or more computer storage media storing computer-useable instructions that, when used by one or more computing devices, cause the one or more computing devices to perform operations comprising:
 receiving, via one or more inputs into a user interface, a representation of selected modalities of a video;
 identifying a machine learning model for each of the selected modalities from a plurality of independent machine learning models designated to extract different features from videos;
 triggering extraction of one or more moments of interest in the video using the identified machine learning model corresponding to each of the selected modalities;
 receiving a representation of the one or more moments of interest in the video; and
 causing the user interface to execute an operation associated with the one or more moments of interest.

11. The media of claim 10, wherein the representation of the one or more moments of interest in the video corresponds to a summary video that includes only the one or more moments of interest, wherein the operation associated with the one or more moments of interest comprises a download or an upload of the summary video.

12. The media of claim 10, wherein the operation associated with the one or more moments of interest comprises updating a video timeline, that provides a browsing functionality, with a visual representation of the one or more moments of interest.

13. The media of claim 10, wherein the operation associated with the one or more moments of interest comprises a search for videos that have one or more identified moments of interest.

14. The media of claim 10, further comprising receiving, via the one or more inputs into the user interface, a representation of selected classes, wherein the extraction of the one or more moments of interest in the video comprises setting corresponding class weights that prioritize the selected classes over other supported classes.

15. The media of claim 10, further comprising receiving, via the one or more inputs into the user interface, a representation of a freeform text query, wherein the extraction of the one or more moments of interest comprises:
 encoding the freeform text query into a textual embedding;
 encoding each frame of the video into a visual embedding; and
 generating a set of importance scores based on cosine similarity between the textual embedding and the visual embedding for each frame.

16. A computer system comprising one or more hardware processors configured to cause the system to perform operations comprising:
 receiving, via one or more inputs into a user interface, a representation of selected modalities of a video, wherein the modalities are selected from a plurality of modalities that each correspond to a different independent machine learning model;
 triggering extraction of one or more moments of interest in the video using an identified machine learning model corresponding to each of the selected modalities;
 receiving a representation of the one or more moments of interest in the video; and
 causing the user interface to execute an operation associated with the one or more moments of interest.

17. The system of claim 16, wherein the representation of the one or more moments of interest in the video corresponds to a summary video that includes only the one or more moments of interest, wherein the operation associated with the one or more moments of interest comprises a download or an upload of the summary video.

18. The system of claim 16, wherein the operation associated with the one or more moments of interest comprises updating a video timeline, that provides a browsing functionality, with a visual representation of the one or more moments of interest.

19. The system of claim 16, wherein the operation associated with the one or more moments of interest comprises a search for videos that have one or more identified moments of interest.

20. The system of claim 16, further comprising receiving, via the one or more inputs into the user interface, a representation of a freeform text query, wherein the extraction of the one or more moments of interest comprises:
 encoding the freeform text query into a textual embedding;
 encoding each frame of the video into a visual embedding; and
 generating a set of importance scores based on cosine similarity between the textual embedding and the visual embedding for each frame.

* * * * *